(12) United States Patent
Nam

(10) Patent No.: US 11,676,433 B2
(45) Date of Patent: Jun. 13, 2023

(54) ENHANCED PROPERTY ACCESS WITH VIDEO ANALYTICS

(71) Applicant: Alarm.com Incorporated, Tysons, VA (US)

(72) Inventor: Ki Ha Nam, Centerville, VA (US)

(73) Assignee: Alarm.com Incorporated, Tysons, VA (US)

( * ) Notice: Subject to any disclaimer, the term of this patent is extended or adjusted under 35 U.S.C. 154(b) by 91 days.

(21) Appl. No.: 17/238,770

(22) Filed: Apr. 23, 2021

(65) Prior Publication Data

US 2021/0335071 A1  Oct. 28, 2021

Related U.S. Application Data

(60) Provisional application No. 63/014,994, filed on Apr. 24, 2020.

(51) Int. Cl.
| | |
|---|---|
| *G07C 9/15* | (2020.01) |
| *G07C 9/28* | (2020.01) |
| *G06T 7/70* | (2017.01) |
| *G07C 9/24* | (2020.01) |
| *G06V 20/52* | (2022.01) |

(52) U.S. Cl.
CPC ............... *G07C 9/15* (2020.01); *G06T 7/70* (2017.01); *G06V 20/52* (2022.01); *G07C 9/247* (2020.01); *G07C 9/28* (2020.01); *G06T 2207/30242* (2013.01)

(58) Field of Classification Search
None
See application file for complete search history.

(56) References Cited

U.S. PATENT DOCUMENTS

| | | | | |
|---|---|---|---|---|
| 10,360,599 | B2 * | 7/2019 | Costello | G06Q 30/01 |
| 10,375,573 | B2 * | 8/2019 | Bergdale | H04M 1/72412 |
| 10,402,631 | B2 * | 9/2019 | Wang | G07C 9/00896 |
| 11,200,767 | B2 * | 12/2021 | Boyes | G07C 9/37 |
| 11,412,157 | B1 * | 8/2022 | Slavin | G06V 10/42 |
| 2009/0167857 | A1 | 7/2009 | Matsuda et al. | |
| 2011/0169917 | A1 * | 7/2011 | Stephen | G06V 40/10 348/46 |
| 2017/0161562 | A1 * | 6/2017 | Astrom | G06V 20/52 |
| 2017/0221289 | A1 * | 8/2017 | Trani | H04W 4/33 |
| 2017/0294088 | A1 | 10/2017 | Patterson et al. | |
| 2018/0060672 | A1 * | 3/2018 | Takeda | G06V 20/52 |

(Continued)

FOREIGN PATENT DOCUMENTS

KR  20210147679 A  * 12/2021

OTHER PUBLICATIONS

PCT International Search Report and Written Opinion in International Appln. No. PCT/US2021/028856, dated Jul. 20, 2021, 10 pages.

*Primary Examiner* — Fekadeselassie Girma
(74) *Attorney, Agent, or Firm* — Fish & Richardson P.C.

(57) ABSTRACT

Methods, systems, and apparatus, including computer programs encoded on computer-storage media, for enhanced property access with video analytics. In some implementations, images of a first area captured by a camera are obtained. A number of persons in the first area is determined from the images. Data indicating one or more unique identifications is received. A number of persons who are authorized to access a second area are determined. Access is provided to the second area.

20 Claims, 4 Drawing Sheets

(56) References Cited

U.S. PATENT DOCUMENTS

| | | |
|---|---|---|
| 2018/0167501 A1 | 6/2018 | Peterson et al. |
| 2019/0141294 A1 | 5/2019 | Thorn et al. |
| 2019/0325682 A1* | 10/2019 | Petkov .............. G07C 9/00563 |
| 2020/0234523 A1* | 7/2020 | Ma ......................... G07C 9/23 |
| 2021/0374426 A1* | 12/2021 | Park .................... G06V 40/172 |

* cited by examiner

ENHANCED PROPERTY ACCESS WITH VIDEO ANALYTICS

CROSS-REFERENCE TO RELATED APPLICATION

This application claims the benefit of U.S. Provisional Application No. 63/014,994, filed Apr. 24, 2020, and titled "ENHANCED PROPERTY ACCESS WITH VIDEO ANALYTICS," which is incorporated by reference in its entirety.

TECHNICAL FIELD

The present specification relates to access control systems.

BACKGROUND

Typical access control systems of residential buildings suffer from unauthorized persons gaining entrance to the residential buildings by tailgating authorized persons through access control points.

SUMMARY

In some implementations, a system can leverage video analytics to determine the number of persons near an access control point of a property. Based on the number of persons, the system can determine a number of unique identifications that are required for the access control point to be unlocked. The number of unique identifications can be the same as the number of persons near the access control point. The number of unique identifications can be less than the number of persons near the access control point. The system can keep the access control point locked until it receives the threshold number of unique authentications.

In some implementations, the system uses a virtual fence to determine the number of persons near the access control point of the property. For example, the virtual fence can define an area adjacent to or including the access control point. The system can determine that the persons near the access control point are those persons within the area, e.g., in the virtual fence. The system can leverage video analytics to determine the number of persons in the virtual fence.

In some implementations, the system uses a virtual fence in determining whether to unlock the access control point. For example, even if the system receives a threshold number of unique identifications, the system can keep the access control point locked until it determines that the unauthorized persons, e.g., those persons that did not provide a unique identification, are outside of a virtual fence that is adjacent to or that includes the access control point.

In some implementations, the access control point of the property is an entrance of the property, an entrance to a particular part of the property, or an elevator of the property. For example, the access control point can be an internal entrance to a residential part of the property. The property can include multiple access control points.

In some implementations, a unique identification can be an identification code assigned to a particular resident or visitor of the property.

In some implementations, the system receives the unique authentications through an RFID reader, an NFC reader, a Bluetooth receiver, and/or a keypad.

In one general aspect, a method performed includes obtaining images of a first area of a property captured by a camera; determining a number of persons located in the first area from the images; receiving data indicating one or more unique identifications; based on the one or more unique identifications, determining a number of persons who are authorized to access a second area of the property; and providing access to the second area.

In some implementations, obtaining images of the first area captured includes obtaining images of an area defined by a virtual fence; and determining the number of persons located in the first area includes determining a number of persons located inside boundaries of the virtual fence.

In some implementations, the method includes: detecting a change in the property; and based on the change in the property, adjusting a size of the virtual fence, where obtaining images of the area defined by the virtual fence includes obtaining images of the area defined by the virtual fence after the adjustment to the size of the virtual fence, and where determining the number of persons located inside the boundaries of the virtual fence includes determining the number of persons located inside the boundaries of the virtual fence after the adjustment to the size of the virtual fence.

In some implementations, detecting the change in the property includes receiving data indicating that an entrance of the property is open; and adjusting the size of the virtual fence includes reducing the size of the virtual fence based on the entrance of the property being open.

In some implementations, detecting the change in the property includes determining that a current time meets (i) a first time range or (ii) a second time range; and adjusting the size of the virtual fence includes (i) reducing the size of the virtual fence based on the current time meeting the first time range or (ii) increasing the size of the virtual fence based on the current time meeting the second time range.

In some implementations, the first time range is a time range within a twenty-four hour period; the second time range is a time range within the twenty-four hour period; and the first time range is earlier in the twenty-four hour period than the second time range.

In some implementations, the first time range is a time range (i) within a twenty-four hour period and (ii) that corresponds to a first amount of expected foot traffic in the property; the second time range is a time range (i) within the twenty-four hour period and (ii) that corresponds to a second amount of expected foot traffic in the property; and the first amount of expected foot traffic is greater than the second amount of expected foot traffic.

In some implementations, detecting the change in the property includes determining that a number of persons in a third area of the property meets a threshold number of persons; and adjusting the size of the virtual fence includes (i) reducing the size of the virtual fence or (ii) increasing the size of the virtual fence.

In some implementations, determining that the number of persons in the second area meets the threshold number of persons includes determining a number of persons located in the third area from the images.

In some implementations, determining that the number of persons in the third area meets the threshold number of persons includes: receiving data indicating a number of persons that have entered the third area from at least one of an entrance of the property or an access control system of the property; receiving data indicating a number of persons that have exited the third area from at least one of an entrance of the property or an access control system of the property; determining a current number of persons in the third area using the number of persons that have entered the third area and the number of persons that have exited the third area;

and comparing the current number of persons in the third area to the threshold number of persons.

In some implementations, providing access to the second area includes: generating instructions for an access control system that is configured to (i) permit access to the second area from the first area in a first mode and (ii) prevent access to the second area from the first area in a second mode, where the instructions include instructions to place the access control system in the first mode to permit access to the second area from the first area; and transmitting the instructions to the access control system.

In some implementations, the method includes determining that a number of the one or more unique identifications meets a threshold number of unique identifications, where providing access to the second area includes providing access to the second area based on the determination that the number of the one or more unique identifications meets the threshold number of unique identifications.

In some implementations, determining that the number of the one or more unique identifications meets the threshold number of unique identifications includes: calculating the threshold number of unique identifications from the number of persons located in the first area; and determining that the number of the one or more unique identifications is greater than or equal to the threshold number of unique identifications.

In some implementations, calculating a threshold number of unique identifications includes applying a predetermined percentage to the number of persons located in the first area.

In some implementations, applying the predetermined percentage includes selecting the predetermined percentage from multiple percentages based on at least one of (i) a time of day, (ii) a number of persons in the first area, (iii) a number of persons traveling through the first area, and (iv) a type of entry to the second area from the first area.

In some implementations, calculating the threshold number of unique identifications includes: providing the number of persons located in the first area as input to an algorithm; and receiving an output of the algorithm, where the output is or indicates the threshold number of unique identifications.

In some implementations, calculating the threshold number of unique identifications includes providing at least one of (i) a time of day, (ii) a number of persons in the first area, (iii) a number of persons traveling through the first area, and (iv) a type of entry to the second area from the first area as input to the algorithm, where the output of the algorithm is based on the number of persons located in the first area and at least one of (i) the time of day, (ii) the number of persons in the first area, (iii) the number of persons traveling through the first area, and (iv) the type of entry to the second area from the first area as input to the algorithm.

In some implementations, calculating the threshold number of unique identifications includes providing at least one of (i) a time of day, (ii) a number of persons in the first area, (iii) a number of persons traveling through the first area, and (iv) a type of entry to the second area from the first area as input to the algorithm, where the output of the algorithm is based on the number of persons located in the first area and at least one of (i) the time of day, (ii) the number of persons in the first area, (iii) the number of persons traveling through the first area, and (iv) the type of entry to the second area from the first area as input to the algorithm.

Other embodiments of these and other aspects disclosed herein include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims

BRIEF DESCRIPTION OF THE DRAWINGS

Like reference numbers and designations in the various drawings indicate like elements.

DETAILED DESCRIPTION

Figure 1:
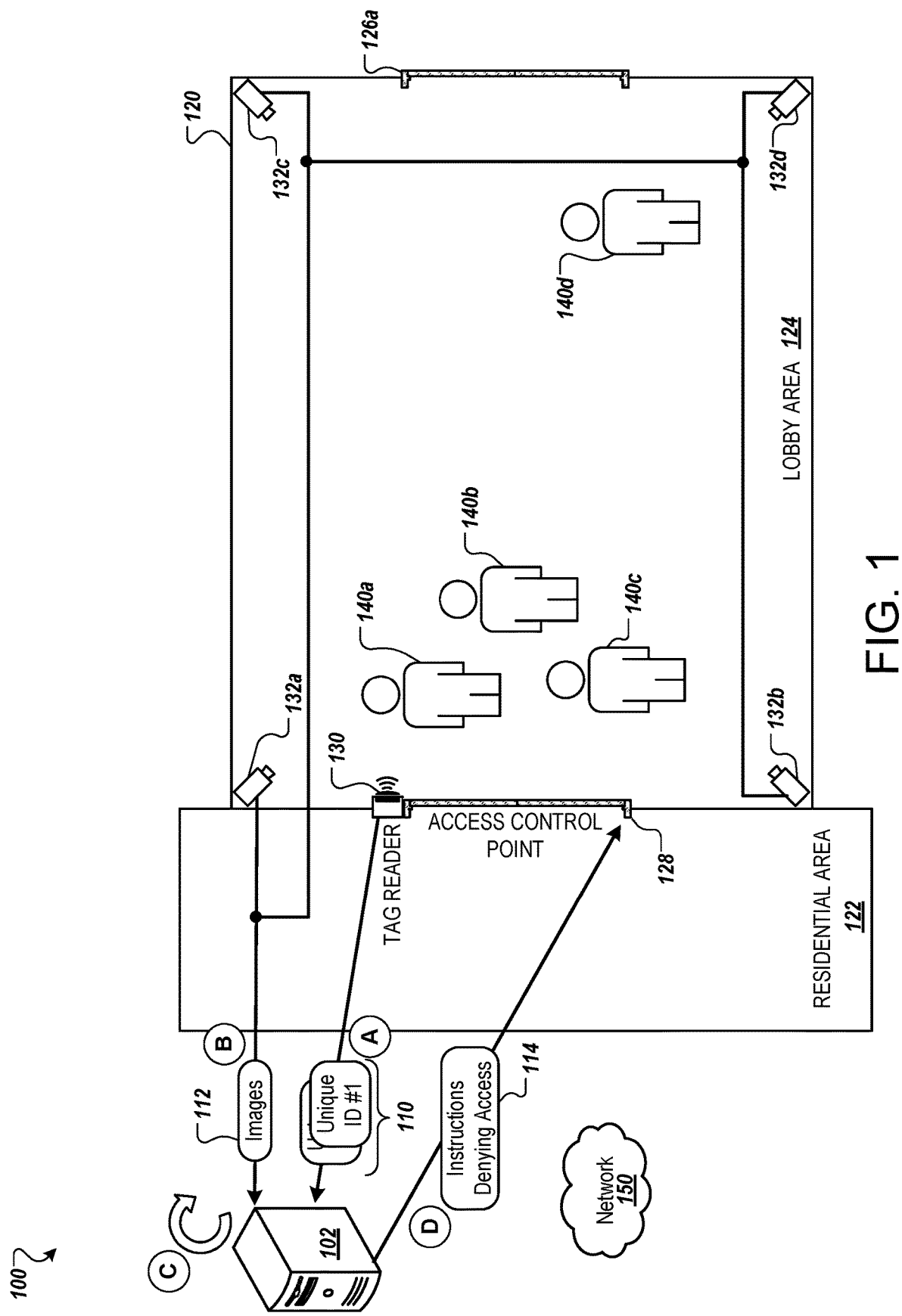
FIG. 1 is a diagram showing an example of a system for enhanced property access with video analytics.

FIG. 1 is a diagram showing an example of a system 100 for enhanced property access with video analytics. The system 100 is an access control system for a property 120. The system 100 includes a management system 102, an access control point 128, a tag reader 130, and cameras 132*a*-132*d*. The system 100 can include one or more additional security devices in addition to the tag reader 130 and the cameras 132*a*-132*d*. For example, the system 100 can include one or more motion detectors, and/or one or more magnetic door or window sensors. The various components of the system 100 can communicate over the network 150, over a wired connection, or over a combination of the network 150 and a wired connection.

Using image data collected by the cameras 132*a*-132*d*, the system 100 can leverage video analytics to determine the number of persons near the access control point 128 of the property 120. Based on the determined number of people, the system 100 can determine a number of unique identifications that are required for the access control point to be unlocked. The number of unique identifications can be the same as the number of persons near the access control point. The number of unique identifications can be less than the number of persons near the access control point. For example, the system 100 may determine the number of unique identifications is half, rounding up, the number of persons near the access control point. The system 100 can keep the access control point locked until it receives the threshold number of unique authentications.

FIG. 1 also illustrates various events, shown as stages (A) to (D), with each representing a step in an example process for enhanced property access with video analytics. Stages (A) to (C) can occur in the illustrated sequence, or in a sequence that is different from the illustrated sequence. For example, some of the stages can occur concurrently.

The property 120 can be any residential or commercial building such as an apartment complex, a condominium, a hotel, an office building, etc. For example, as shown, the property 120 is an apartment complex, a condominium, or hotel having a residential area 122, a lobby area 124, and an entrance 126a (e.g., an external entrance of the property 120). As shown, the access control point 128 separates the residential area 122 from the lobby area 124. The residential area 122 may be in area to which access is controlled by the access control point 128. The lobby area 124 may be an area inside a building of the property to which access is not controlled by the access control point 128. The entrance 126a (e.g., the external entrance of the property 120) may be an entrance between a building and outside the building.

The access control point 128 can be used to increase the security of the property 120, e.g., to increase the security of residents of the property 120 living in the residential area 122 of the property 120. The access control point 128 can be an entrance of the property 120, an entrance to a particular part of the property 120, or one or more elevators of the property 120. For example, as shown, the access control point 128 is an internal entrance to the residential area 122 of the property 120. The access control point can include the tag reader 130. The state of the access control point 128 can be controlled by the management system 102. For example, the access control point 128 can have a default locked state that prevents persons from entering the residential area 122 from the lobby area 124 (though it may still let persons enter the lobby area 124 from the residential area 122). The property 120 can include multiple access control points.

In more detail, the access control point 128 can be or include one or more doors having an electronic lock, e.g., when the access control point 128 is an entrance of the property 120. The state of the electronic lock, e.g., locked state or unlocked state, can be controlled by the management system 102. As an example, when the access control point 128 is in a locked state, the electronic lock can be in a locked state. Similarly, when the access control point 128 is in an unlocked state, the electronic lock can be in an unlocked state. Where the access control point 128 includes one or more doors, the access control point 128 can also include one or more magnetic door sensors and/or one or more motion detectors.

Additionally or alternatively, the access control point 128 can be or include one or more elevators. Each of the one or more elevators can include a tag reader. The floors that are unlocked, e.g., the floors that the one or more elevators are permitted to travel to, can be controlled by the management system 102. As an example, when the access control point 128 is in a locked state, the one or more elevators may be authorized only to travel to and/or open for the lobby floor. Similarly, when the access control point 128 is in an unlocked state, the one or more elevators can be authorized to travel to all floors, to only those floors that correspond to the unique identifications received, or to a particular set of floors while requiring further authentication for unlocking floors outside of the particular set (e.g., can require further authentication to unlock the penthouse floor, the top two floors, a rooftop floor, a basement floor, etc.).

In some implementations, the access control point 128 includes a combination of the one or more doors having an electronic lock and the one or more elevators.

The tag reader 130 can be part of the access control point 128. The tag reader 130 can be an RFID reader, an NFC reader, a Bluetooth receiver, etc. In some implementations, a keypad is used in place of the tag reader 130. In some implementations, the tag reader 130 includes a keypad through which persons can enter an identification or an alternate identification, e.g., if they don't have their RFID device (e.g., fob, card, smartphone, etc.) having an RFID tag, NFC device (e.g., fob, card, smartphone, etc.) having an NFC tag, Bluetooth device (e.g., having a digital ID), etc.

The cameras 132a-132d can include one or more visible light cameras and/or one or more infrared (IR) cameras. For example, an IR camera can be used to quickly locate persons in the lobby area. Multiple visible light cameras can then be used to obtain images of the face of each of the persons. The cameras 132a-132d can each be a visible light camera. The cameras 132a-132d can each be an IR camera.

The management system 102 can include one or more computing devices. The management system 102 can also include one or more data storage devices. The data storage devices may be able to store (e.g., temporarily for a set period of time) images of residents of the property 120, guests of the property 120, persons who are not permitted on the property 120, and/or other persons in the property 120, such as persons in the lobby area 124 of the property 120. The data storage devices can also include access control settings.

The access control settings can indicate a number of valid, unique identifications that are needed to produce unlock instructions. For example, the access control settings can indicate the number of valid, unique identifications that are needed for a given number of persons near the access control point 128, for a given number of persons in the lobby area 124, for a given number of persons in virtual fence, etc.

The access control settings can indicate the time out period until the management system 102 requires previously unique identifications to be entered again. For example, the time out period can be fifteen seconds, thirty seconds, one minute, etc. After a time out period has elapsed (e.g., after thirty seconds has passed since an occupant had their access key scanned by the tag reader 130 of the access control point 128), the access control point 128 can automatically relock. The access control settings can indicate the length of time that the access control point 128 should be unlocked for after it receives unlock instructions from the management system 102. The access control settings can indicate the size and/or location of a virtual fence. The access control settings can indicate one or more alternative sizes and/or locations of the virtual fence. The access control settings can include controls for a dynamic virtual fence. The access control settings can indicate what floors of an elevator should be unlocked when the management system 102 determines that unlock instructions should be sent to the elevator, e.g., based on the one or more unique identifications that the management system 102 receives. The access control settings can include resident and guest profiles. These profiles can indicate the amount of time that the resident or guest is permitted to access the property 120 (e.g., can include a lease end date, a check out date, etc.).

The management system 102 can communicate with the access control point 128 and/or the tag reader 130, e.g., over the network 150. The management system 102 can also communicate with other devices such as, for example, a magnetic door sensor of the entrance 126a, a motion detector of the entrance 126a, a magnetic door sensor of the access control point 128, a motion detector of the access control point 128, etc. The management system 102 can communicate with mobile devices of persons, such as mobile devices of residents and guests. The management system 102 can receive entry requests through a mobile application running on the mobile devices. The management system 102 can communicate with management or administrative devices. The management system 102 can receive new access control settings from the management/administrative devices, and/or modifications to the access control settings from the management/administrative devices.

The management system 102 can communicate with mobile devices of employees and contractors, such as mobile devices of leasing agents, doormen, security, or the like. The management system 102 can send notifications to these mobile devices when it determines that one or more persons in the lobby area 124 do not have valid identifications, have attempted to gain entrance through the access control point 128, have improperly gained entrance through the access control point 128, and/or have been in the lobby area 124 greater than a threshold amount of time (e.g., ten minutes, thirty minutes, one hour, etc.). In some implementations, the management system 102 is the monitoring server 460 shown in FIG. 4.

As an example, residents may be able to send requests for temporary identifications for guests to the management system 102 over the network 150. Similarly, guests may be able to send requests for temporary identifications to the management system 102 over the network 150. The requests can be sent through a mobile application running on the resident devices and/or guest devices. A request can include a photograph of the corresponding guest such as a recently taken photograph (e.g., a photograph taken in the last five minutes, last thirty minutes, last hour, etc.). A request can include personal information of the corresponding guest such as a name of the guest, an address of the guest, a birth date of the guest, etc. A request can include an image of an identification of the guest, such as an image of the guest's driver's license. A request can be a request for entry for multiple guests. A request can include an indication of the number of guests seeking entrance.

The network 140 can include public and/or private networks and can include the Internet.

The techniques disclosed in this document can be used to improve access control systems by reducing the likelihood of unauthorized access and, therefore, improve the safety of residents and guests. The system 100 can improve access control systems by dynamically adjusting the requirements to unlock an access control point of a property to ensure that there is a low likelihood or a sufficiently low likelihood of an unauthorized person entering a protected part of a property, such as a residential area of a property. In determining the requirements, the system 100 can take into account the number of persons in a monitored area of the property, doors of the property that are open, the time of day, among other factors. Through these dynamic adjustments to the lock/unlock requirements, the system 100 can improve the security afforded to occupants (e.g., when occupants are more at risk), improve the convenience afforded to occupants (e.g., when occupants are less at risk), and/or balance the needs of occupant safety and convenience.

The system 100 can make improvements access control systems using other techniques. For example, the system 100 can make other types of dynamic adjustments to improve the security afforded to occupants, improve the convenience afforded to occupants, and/or balance the needs of occupant safety and convenience. As an example, the system 100 can use a virtual fence to set, directly or indirectly, requirements for unlocking or locking an access control point. Using various factors, the system 100 can dynamically adjust the size, shape, and/or location of the virtual fence to balance the needs of occupant safety with occupant convenience. As a result, the system 100 can provide a secure access control system that remains practical to use.

In stage A, the management system 102 receives unique identifications 110. As shown, the unique identifications 110 includes two unique identifications that correspond to two of the persons in the lobby area 124 of the property 120. These unique identifications 110 can include identifications read by the tag reader 130. The management system 102 can receive the unique identifications 110 from the tag reader 130. The management system 102 can receive the unique identifications 110 from the access control point 128, e.g., when the tag reader 130 is part of the access control point 128. Each of the identifications in the unique identifications 110 can correspond to one particular persons.

The unique identifications 110 can include a unique name or username, a unique ID number or alphanumeric ID, a near-field communication tag UID, a radio frequency identification tag UID, a serial number (e.g., assigned to a particular person or preprogrammed in a tag of a device that belongs to a particular person), etc.

As an example, the unique identifications 110 can include a unique identification for the person 140a and a unique identification for the person 140b. This indicates that the tag reader 130 has read a tag belonging to the person 140a and a tag belonging to the person 140b, e.g., within a threshold amount of time.

In stage B, the cameras 132a-132d collect images 112 and send the images 112 to the management system 102. The images 112 can be image data or video data. The images 112 can be of the lobby area 124 of the property 120. In some implementations, the images 112 can include images collected from other monitored parts of the property 120, e.g., by one or more other cameras.

In stage C, the management system 102 determines the number of persons in the monitored area of the property 120 using the images 112. For example, the management system 102 can use the images 112 to determine that there are four persons in the lobby area 124 of the property 120, e.g., where the monitored area includes the entirety of the lobby area 124. As another example, as will be discussed in more detail with respect FIG. 2, the management system 102 can determine that there are three persons near the access control point 128, e.g., where the monitored area is an area within the lobby area 124 that includes or is adjacent to the access control point 128. As will be discussed in more detail with respect FIG. 2, the monitored area can be defined using a virtual fence.

The management system 102 can use the number of persons in the monitored area to determine a threshold number of unique identifications required to unlock the access control point 128. The threshold number can be equal to or less than the number of persons detected in the monitored area of the property 120. For example, if there are four detected persons in the monitored area, the management system 102 can determine that a threshold of three unique identifications is required to unlock the access control point 128. The threshold number can depend on the number of persons detected in the monitored area of the property 120. For example, the threshold number can be calculated using a formula that includes as a variable the number of persons detected in the monitored area of the property 120. For example, the threshold number can be one less than the number of persons detected in the monitored area of the property 120, e.g., when there are more than two persons in the monitored area of the property 120. Accordingly, where the monitored area is the lobby area 124, the threshold number would be three unique identifications.

In some implementations, the threshold number can be dependent on one or more other factors. The threshold number can depend on the time of day. For example, the threshold number may be less during high travel times of the day in order to provide greater convenience and may be higher during low travel times of the data in order to provide greater security. Specifically, the management system 102 can determine that the threshold number is two less than the number of persons detected in the monitored area (e.g., when there are more than two persons in the monitored area) between the hours of 8:01 am and 8:00 pm, and that the threshold number is equal to the number of persons detected in the monitored area between the hours of 8:01 pm and 8:00 am.

The threshold number can depend on the type of access control point that the access control point 128 is. For example, where the access control point 128 is or includes an elevator, the threshold number may always be equal to the number of persons detected in the elevator. The management system 102 can use, for example, one or more cameras in the elevator to determine the number of persons in the elevator. The images 112 can include images from cameras in the elevator. The tag reader 130 can be installed in the elevator. Alternatively, the elevator can include a separate tag reader. If the management system 102 determines that the number of unique identifications that it receives as part of the unique identifications 110 is less than a detected number of persons in the elevator, the management system 102 can send instructions to the elevator preventing the elevator from operating, preventing the elevator door from closing, causing the elevator door to open, and/or preventing the elevator from traveling to any floor but the lobby floor.

The management system 102 can compare the of unique identifications in the unique identifications 110 to the threshold number of unique identifications in determining if the access control point 128 should be unlocked. For example, where the threshold number of unique identifications is determined to be three based on there being four persons in the lobby area 124 and where the unique identifications 110 includes two unique identifications, the management system 102 can determine that the access control point 128 should remain locked.

In stage D, the management system 102 sends instructions 114 denying access through the access control point 128. In some implementations, where the access control point 128 defaults to a locked state, the management system 102 instead determines not to send any instructions to the access control point 128. In some implementations, the instructions 114 denying access are only sent to the access control point 128 if the access control point 128 is currently in an unlocked state. For example, if conditions at the property 120 change (e.g., if the entrance 126a is opened, if another person enters the lobby area 124, etc.), the management system 102 can send the instructions 114 denying access through the access control point 128 in order to lock the access control point, e.g., lock the access control point 128 before it would have automatically locked itself.

Based on determining that access control point 128 should not be unlocked and/or based on there being one or more persons in the lobby area 124 that are permitted to enter the residential area 122, the management system 102 can generate and send one or more notifications. These notifications can be generated and sent to a computing device of the manager of the property 120, to one or more devices of employees or contractors of the property 120 (e.g., to security personnel), to residents of the property 120, to guests of the property 120, etc. For example, the management system 102 can generate and send a notification to the persons 140a-140b after determining that they are both authorized to access the residential area 122, e.g., that they are residents of the property 120, explaining that there are too many people in the lobby area 124 and/or near the access control point 128, that an employee has been notified and is on the way to provide them access, that security has been alerted to remove the persons 140c-140d from the lobby area 124, etc.

In some implementations, the management system 102 can use the images 112 to reduce the threshold number of unique identifications required to unlock the access control point 128. The management system 102 can perform facial recognition using the images 112 to identify one or more of the persons 140a-140d in the lobby area 124. In identifying one or more of the persons 140a-140d, the management system 102 can compare the images 112 to one or more stored images, e.g., stored images of residents and/or guests of the property. The management system 102 can determine if any of the identified persons correspond to the unique identifications 110. If any of the identified persons do not correspond to any of the unique identifications 110, the management system 102 can reduce the threshold number of unique identifications required to unlock the access control point 128.

As an example, if the unique identifications 110 correspond to the persons 140a-140b and if the management system 102 uses the images 112 to determine that three of the persons 140a-140d in the lobby area 124 are authorized to enter the residential area 122, the management system 102 can reduce the threshold number of unique identifications required to unlock the access control point 128 from three unique identifications to two unique identifications. Accordingly, due to having received two unique identifications of the unique identifications 110, the management system 102 would send unlock instructions to the access control point 128.

As example, if the unique identifications 110 correspond to the persons 140a-140b and if the management system 102 uses the images 112 to determine that the person 140c in the lobby area 124 is authorized to enter the residential area 122, the management system 102 can reduce the threshold number of unique identifications required to unlock the access control point 128 from three unique identifications to two unique identifications. Accordingly, due to having received two unique identifications of the unique identifications 110, the management system 102 would send unlock instructions to the access control point 128.

As example, if the unique identifications 110 correspond to the persons 140a-140b and if the management system 102 uses the images 112 to determine that the person 140d in the lobby area 124 is authorized to enter the residential area 122 and/or that the person 140c is not authorized to enter the residential area 122, the management system 102 can maintain the threshold number of unique identifications required to unlock the access control point 128 due to the person 140d being relatively far away from the access control point 128, due to the person 140c being relatively close to the access control point 128, and/or due to the person 140d being farther away from the access control point 128 than the person 140c. Accordingly, due to having received only two unique identifications of the unique identifications 110, the management system 102 would still send the instructions 114 denying access through the access control point 128.

Similarly, in some implementations, the management system 102 can use the images 112 to increase the number of unique identifications detected. The management system 102 can perform facial recognition using the images 112 to identify one or more of the persons 140a-140d in the lobby area 124. In identifying one or more of the persons 140a-140d, the management system 102 can compare the images 112 to one or more stored images, e.g., stored images of residents and/or guests of the property. The management system 102 can determine if any of the identified persons correspond to the unique identifications 110. If any of the identified persons do not correspond to any of the unique identifications 110, the management system 102 can look up the identifications of those persons. The management system 102 can use these identifications along with the unique identifications 110 in determining if a threshold number of identifications to unlock required to unlock the access control point 128 has been met.

As an example, if the unique identifications 110 correspond to the persons 140*a*-140*b* and if the management system 102 uses the images 112 to determine that three of the persons 140*a*-140*d* in the lobby area 124 are authorized to enter the residential area 122, the management system 102 can identify the person whose identification was not received through the tag reader 130 and can add their corresponding identification to the list of detected unique identifications. The management system 102 can, therefore, determine that it has detected three unique identifications. Accordingly, due to having detected three unique identifications and due to the threshold number of unique identifications being three unique identifications, the management system 102 would send unlock instructions to the access control point 128.

As example, if the unique identifications 110 correspond to the persons 140*a*-140*b* and if the management system 102 uses the images 112 to determine that the person 140*c* in the lobby area 124 is authorized to enter the residential area 122, the management system 102 can look up an identification corresponding to the person 140*c* and add the identification to the list of detected unique identifications. The management system 102 can, therefore, determine that it has detected three unique identifications. Accordingly, due to having detected three unique identifications and due to the threshold number of unique identifications being three unique identifications, the management system 102 would send unlock instructions to the access control point 128.

As example, if the unique identifications 110 correspond to the persons 140*a*-140*b* and if the management system 102 uses the images 112 to determine that the person 140*d* in the lobby area 124 is authorized to enter the residential area 122 and/or that the person 140*c* is not authorized to enter the residential area 122, the management system 102 can increase the threshold number of unique identifications required to unlock the access control point 128 (e.g., from three to four unique identifications) or can choose to not add the identification corresponding to the person 140*d* to the list of detected unique identifications due to the person 140*d* being relatively far away from the access control point 128, due to the person 140*c* being relatively close to the access control point 128, and/or due to the person 140*d* being farther away from the access control point 128 than the person 140*c*. Accordingly, the management system 102 would still send the instructions 114 denying access to the access control point 128.

Figure 2:
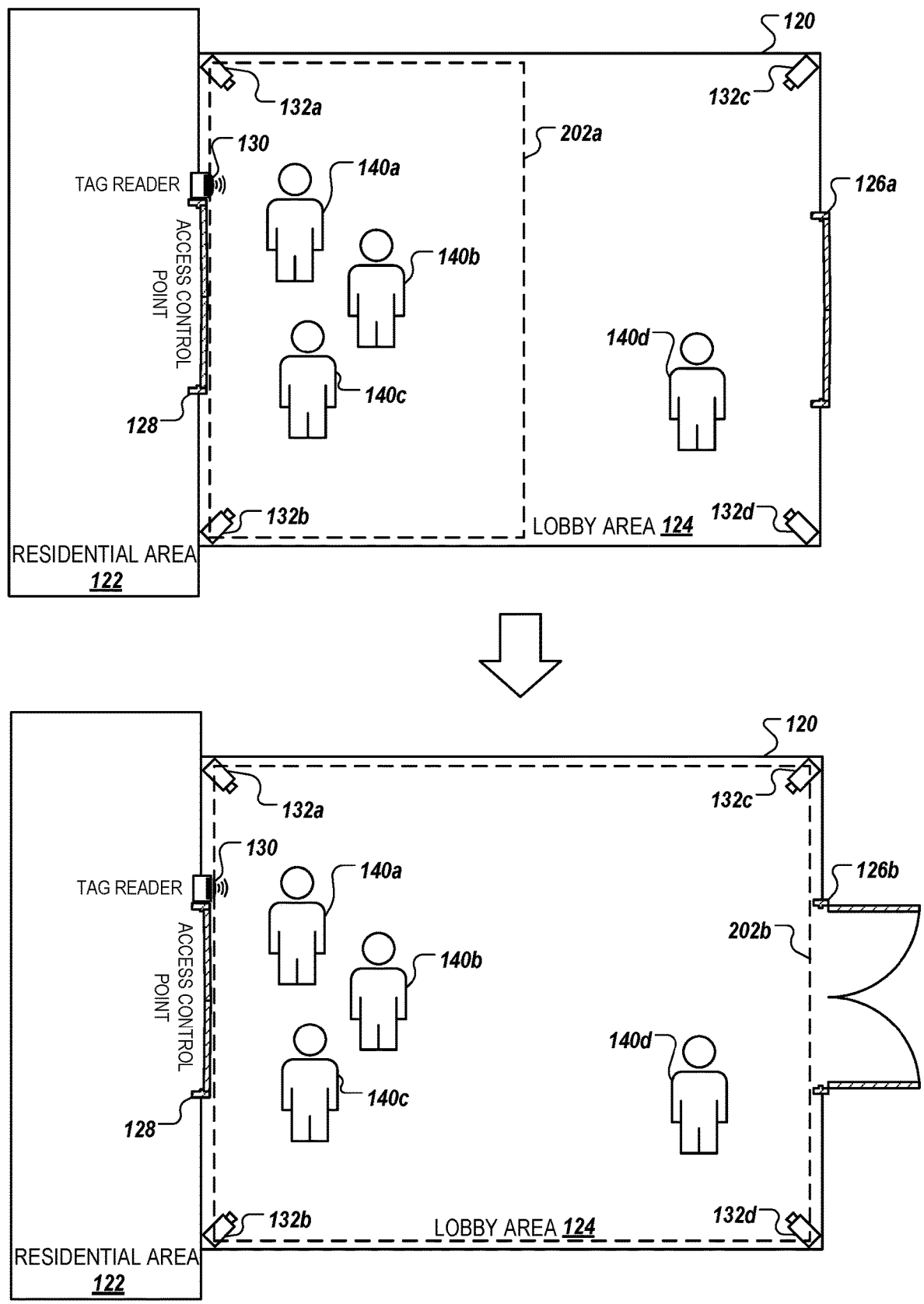
FIG. 2 is a diagram showing an example of using a system for enhanced property access with a virtual fence.

FIG. 2 is a diagram showing an example of using the system 100 for enhanced property access with a virtual fence 202.

The virtual fence 202 can indicate the area of the property 120 being monitored. That is, the virtual fence 202 can define the area that the management system 102 uses to determine a number of persons in the monitored area. In turn, the management system 102 can use this determination to calculate a threshold number of unique identifications required to unlock the access control point 128.

The size and/or shape of the virtual fence 202 can be dynamic. For example, the size and/or shape of the virtual fence 202 can depend on a time of day (e.g., if it is a time of day that is associated with high traffic, if it is a time of day that is associated with low traffic, if it is at night where greater security is needed, etc.), on whether the entrance 126*a* of the property 120 is open, and/or on the number of persons in the lobby area 124. As an example, the size of the virtual fence can be dynamically reduced in size during times when higher foot traffic is expected (e.g., based on the time of day) or detected (e.g., using the cameras 132*a*-132*d*, using one or more motion detectors of the entrance 126*a*, using one or more magnetic door sensors of the entrance 126*a*, using one or more motion detectors of the access control point 128, using one or more magnetic door sensors of the access control point 128, etc.).

As shown, the virtual fence 202*a* has a first size when the entrance 126*a* is closed. With respect to FIG. 1, the management system 102 can determine based on the images 112 that there are three persons in the virtual fence 202*a*. Based on the number of persons in the virtual fence 202*a*, the management system 102 can determine a threshold number of required unique identifications. For example, the management system 102 can determine that the threshold number of required unique identifications is two (e.g., one less than the number of persons in the virtual fence 202*a*, or two-thirds the number of persons in the virtual fence 202*a*) or three (e.g., equal to the number of persons in the virtual fence 202*a*). If the threshold number of required unique identifications is two, based on there being two unique identifications in the unique identifications 110, the management system 102 can send unlock instructions to the access control point 128. If the threshold number of required unique identifications is three, based on there being two unique identifications in the unique identifications 110, the management system 102 can send the instructions 114 denying access to the access control point 128.

However, when the entrance 126*b* is opened, the system 100 (e.g., the management system 102) increases the size of the virtual fence 202*b* to include the entirety of the lobby area 124. This size increase can be made in anticipation of and to account for additional persons coming into the lobby area 124, and/or in anticipation of someone running through the entrance 126*b* towards the access control point 128. With respect to FIG. 1, the management system 102 can determine based on the images 112 that there are now four persons in the virtual fence 202*b*. Based on the number of persons in the virtual fence 202*b*, the management system 102 can determine that the threshold number of required unique identifications is now three (e.g., one less than the number of persons in the virtual fence 202*a*, or two-thirds the number of persons in the virtual fence 202*a* rounded to the nearest whole number) or four (e.g., equal to the number of persons in the virtual fence 202*a*). Based on there being only two unique identifications in the unique identifications 110, the management system 102 can send instructions 114 denying access through the access control point 128. Accordingly, if the access control point 128 was unlocked in response to the previously sent instructions and if no one opened the access control point 128, the access control point 128 will be locked, preventing the persons 140*a*-140*d* from accessing the residential area 122 until an additional unique identification is received.

The size of the virtual fence 202*b* can be increased by the management system 102 in response to the management system 102 detecting that the entrance 126*b* is open. For example, the management system 102 can detect that the entrance 126b is open based on sensor data it receives, e.g., sensor data from one or more motion detectors of the entrance 126b and/or sensor data from one or more magnetic doors sensors of the entrance 126b.

In some implementations, where the access control point 128 is or includes an elevator, if a person comes in to the elevator after the elevator door has started to close, the door will open again and won't operate until a unique identification is received for the new person or until an additional unique identification is received. If the person does not have a valid unique identification, the management system 102 will require that the person exit the elevator and step away from the elevator door in order for the elevator to operate.

The virtual fence 202 can be used with the elevator. For example, the elevator itself can form an initial monitored area used by the management system 102 in determining a threshold number of unique identifications required. However, once the management system 102 has determined that a person in the elevator is not authorized (e.g., has not provided a unique identification and/or cannot be verified a different way), the management system 102 can use or generate the virtual fence 202 that is adjacent to or includes the elevator. The management system 102 can refrain from sending unlock instructions to the elevator, e.g., such that the elevator door does not close and/or the elevator does not operate, until the management system 102 determines that the person is no longer in the virtual fence 202. The size of the virtual fence 202 can be selected such that the distance from its perimeter to the elevator door would be such that a person walking an average speed (e.g., 3 MPH, 3.5 MPH, 4 MPH, etc.) could not reach the elevator before the elevator door closed if the elevator door started to close when the person entered the virtual fence. For example, if the elevator doors closes in two seconds, the size and/or shape of the virtual fence 202 can be selected such that every point of the virtual fence 202 (except for those points that come into contact with a wall or the elevator) is 11.73 feet away from the elevator to account for people walking 4 MPH or slower towards the elevator.

In some implementations, where the access control point 128 is or includes an elevator, the size and/or shape of the virtual fence 202 can depend on percentage that the elevator door is open. The size and/or shape of the virtual fence 202 can be calculated as an equation of the percentage that the elevator door is open. For example if the elevator door is 100% open, the management system 102 can increase the size and/or change the shape of the virtual fence 202 or can keep the virtual fence 202 at its maximum size, e.g., such that it covers the lobby area 124 entirely and/or such that every point of the virtual fence except for those points that come into contact with a wall or the elevator is twenty feet away from the elevator. If the management system 102 determines that the elevator door is closing and is about 50% open, the management system 102 can decrease the size and/or change the shape of the virtual fence 202, e.g., such that it covers half of the lobby area 124 and/or such that every point of the virtual fence expect for those points that come into contact with a wall or the elevator is ten feet away from the elevator. If the management system 102 determines that the elevator door is closed (0% open), the management system 102 can temporarily remove the virtual fence 202.

In some implementations, the management system 102 can instruct devices of the system 100 to enter or exit a low-power consumption mode. The devices can include the cameras 132a-132d. As an example, an administrator can provide instructions to the management system 102 specifying that the management system 102 should set a low-power consumption mode for the video analytic cameras of the property 120 (or a particular portion of the property 120). In this mode, all or a portion of the video analytics cameras may only be enabled (e.g., by the management system 102) when at least one door or window of the property 120 is opened (e.g., the entrance 126). That is, the managements system 102 can assume based on the doors and/or windows of the property being closed that the number of occupants in the property 120, or a certain portion of the property 120, will not change. As such, the system 100 can conserve resources when additional image data would provide no or limited security benefits.

As an example, in response to receiving instructions from an administrator specifying that the cameras of the property 120 should enter a low-power consumption mode and based on the entrance 126a being closed, the management system 102 may generate and transmit instructions to the cameras 132c-132d to enter a sleep mode. However, the cameras 132a-132b may remain in an active mode since they are monitoring the portion of the property 120 bounded by the virtual fence 202a and will continue to monitor this portion of the property 120 to determine if any of the persons 140a-140c step outside the bounds of the virtual fence 202a or if any other occupants (e.g., person 140d) enter the virtual fence 202a.

Additionally or alternatively, in this low-power consumption mode, video analytics cameras may only be enabled (e.g., by the management system 102) when the authentication process is started at the access control point 128 to determine if the access control point 128 should be opened. For example, if each of the persons 140a-140d are located outside the bounds of the virtual fence 202a when the monitoring system 102 receives instructions, the management system 102 can generate and transmit instructions to each of the cameras 132a-132d to enter a sleep mode. However, when an occupant brings a tag sufficiently close to the tag reader 130 for the tag reader 130 to detect and/or acquire information from the tag, all or a portion of the cameras 132a-132d (e.g., the cameras 132a-132b) may be enabled and start actively monitoring the portion of the property 120 defined by the virtual fence 202a. As an example, the management system 102 may, in response to receiving a unique ID acquired by the tag reader 130, generate and transmit instructions to the camera 132a and the camera 132b to enable both cameras. As another example, the cameras 132a-132b may be activated in response to directly receiving sensor data such as data from a motion sensor installed at the access control point 128 that indicates that motion has been detected near the access control point 128.

In some implementations, entering a low-power consumption mode includes disabling only the cameras that are not monitoring an entrance of a property. For example, in response to determining that a low-power consumption mode should be entered, the management system 102 may send instructions only to the cameras 132a-132b to enter a low-power sleep mode.

In some implementations, entering a low-power consumption mode includes disabling only the cameras that are not monitoring a virtual fence for an access control point of the property. For example, in response to determining that a low-power consumption mode should be entered, the management system 102 may send instructions only to the cameras 132c-132d to enter a low-power sleep mode.

When not enabled, the video analytic cameras may be turned off or be in a standby/sleep/low-power mode or an otherwise suspended state. For example, in response to receiving the instructions for a low-power consumption mode, the management system 102 can transmit instructions to the cameras 132a-132d to enter a standby mode. After a certain amount of time passes and in response to detecting that the entrance 126 has been opened, the management system 102 can transmit new instructions to the cameras 132a-132d to wake from the standby mode, start collecting image data, and/or transmitting image data to the management system 102.

In some implementations, the management system 102 or one or more other components of the system 100 enters the low-power consumption mode automatically. One or more factors may be used by the management system 102 or the other components to determine when the low-power consumption mode should be entered. These factors can include a time dimension such as a time lapse, and/or an event dimensions such as door or window opening event. For example, in response to determining that the entrance 126 has not been opened for five minutes, the managements system 102 can instruct all or a subset of the cameras 132a-132d to enter a sleep mode. Similarly, in response to receiving data indicating that the entrance 126 is closed and the access control point 128 is closed, the cameras 132a-132d can automatically enter a low-power mode.

As another example, after the management system 102 has completed analyzing the image data collected by the cameras 132a-132d to determine the number of people in the lobby area 124 when the entrance 126 is closed, the management system 102 can generate instructions to disable the cameras 132a-132d until the entrance 126 is opened and transmit the instructions to the cameras 132a-132d (or to a microcontroller for the cameras 132a-132d).

In some implementations, the cameras 132a-132d are able to wake themselves from a low-power consumption mode. For example, the cameras 132a-132d may be configured to receive data directly from one or more other sensors that acts as a triggering mechanism to wake the cameras 132a-132d from standby or suspension. In more detail, the cameras 132a-132d may receive data from a motion sensor installed at the entrance 126 that detects when the entrance 126 is opened and/or when a person passes through the entrance 126. In response to receiving sensor data indicating that the entrance 126 has been opened and/or a person has passed through the entrance 126, the cameras 132a-132d may wake from their standby or suspension, start collecting image data, and transmitting the image data to the management system 102.

In some implementations, the cameras 132a-132d can be wakened from a low-power mode within a few seconds. For example, the camera 132a can waken within one, two, or three seconds of receiving wake instructions from the management system 102.

Entering a low-power consumption mode can save significant resources. For example, not only is power saved by having potentially multiple cameras turned off or in a low-power mode, but various types of computer resources can be conserved as well. For example, the amount of CPU hours, RAM, and memory spent on having to collect, store, and/or process image data is reduced as result of disabling cameras. Other types of resources can also be conserved when devices such as cameras enter this low-power consumption mode. These other resources can include networking resources such as bandwidth.

Figure 3:
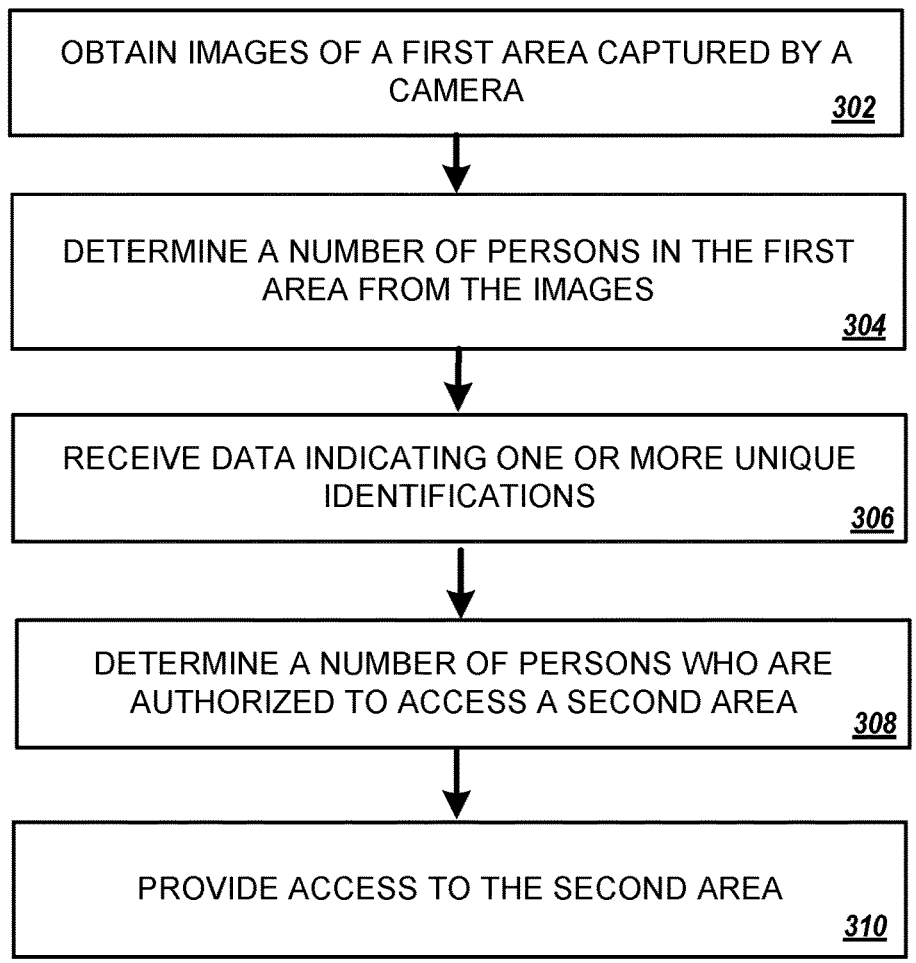
FIG. 3 is a flowchart of an example process for providing enhanced property access with video analytics.

FIG. 3 is a flowchart of an example process for providing enhanced property access with video analytics. The process 300 can be performed, at least in part, using the system 100 described in FIG. 1 or the monitoring system 400 described in FIG. 4. For example, the process 300 can be performed by the management system 102.

The process 300 includes obtaining images of a first area captured by a camera (302). For example, as shown in FIG. 1, the management system 102 can use the cameras 132a-132d to acquire images 112 of the lobby area 124 in the property 120. The images 112 can be transmitted to the management system 102 as, for example, multiple static images files or one or more video files.

The first area can be a specific part of a property. For example, with respect to FIG. 1, the first area can be the lobby area 124. The first area may be selected automatically by the management system 102 or may be selected manually by a user. For example, an administrator may select the lobby area 124 for monitoring to control the access control point 128.

The first area may not be limited to a specific size or specific portion of a property. For example, the first area may have a dynamic size, shape, and/or location based on one or more factors discussed above with respect to FIG. 2 and in more detail below. With respect to FIG. 2, the first area can be defined by the virtual fence 202. The size and/or location of the virtual fence 202 can be based on one or more factors, such as a time of day, a detected number of unique individuals located in the property 120 or the lobby area 124 of the property, a detected number of individuals that have passed through the entrance 126 and/or the access control point 128, an indication whether the entrance 126 is in an open or closed state, a detected number of unique individuals located within the lobby area 124, a detected number of unique individuals located within the lobby area 124 and a threshold distance from the access control point, a detected number of unique individuals located within the lobby area 124 and a number of unique tags detected by the tag reader 130, a detected number of unique individuals within the boundaries of the virtual fence, etc.

The size, shape, and/or location of the virtual fence may be dynamically adjusted using one or more factors to balance occupant convenience and safety. For example, the management system 102 may adjust the size, shape, and/or location of the virtual fence based on the time of day, the detected amount of foot traffic in the property, and/or an expected amount of foot traffic in the property (e.g., based on patterns of foot traffic corresponding to different times, days of the week, times of the year, events, etc.).

As an example, the management system 102 can refer to a schedule for controlling the access control point 128. The schedule may include, for example, various times or time ranges that correspond to different virtual fence sizes and/or locations. The schedule may indicate, for example, that during the day (e.g., between the hours of 8:01 am and 8:00 pm) when there is likely to be more persons physically located in the lobby area 124, the management system 102 can reduce the size of the virtual fence 202 and, thereby, improve convenience of persons attempting to pass through the access control point 128. By reducing the size of the virtual fence 202 (e.g., from the size of the virtual fence 202b to the size of the virtual fence 202a), the number of unique tags required by the management system 102 to provide access through the access control point 128 can be lowered due to the increased likelihood of there being less people located within the virtual fence 202. Accordingly, users attempting to pass through the access control point 128 during the day are less likely to be denied entry by the management system 102.

However, the schedule may indicate that at night (e.g., between the hours of 8:01 pm and 8:00 am), when security is prioritized over convenience, the management system 102 is to increase the size of the virtual fence 202. Security may be prioritized over convenience during specific times or time ranges based on an expected number of persons in the lobby area 124, an expected amount of foot traffic in the property 120 and/or through the access control point 128, and/or safety factors (e.g., more burglaries or break-ins expected to happen at night). By increasing the size of the virtual fence 202 (e.g., from the size of the virtual fence 202a to the size of the virtual fence 202b), the number of unique tags required by the management system 102 to provide access through the access control point 128 can be increased due to the increased likelihood of there being more people located within the virtual fence 202. Accordingly, users attempting to pass through the access control point 128 during the night are more likely to be denied entry by the management system 102. However, this also has the effect of reducing unauthorized access to the residential area 122, thereby improving safety afforded to occupants of the property 120.

When referring to a schedule, the management system 102 can determine that a current time meets a particular time or a particular time range. The particular time or time range can correspond to an event for the management system 102 to adjust the virtual fence in a particular way, such as by adjusting the size, shape, and/or location of the virtual fence. For example, the schedule for a particular day may include a first time range that corresponds to the virtual fence 202a and a second time range that corresponds to the virtual fence 202b. Upon detecting that the current time crosses into the first time range, the management system 102 can decrease the size of the virtual fence to meet particular, e.g., predetermined, dimensions. Similarly, upon detecting that the current time crosses into the second time range, the management system 102 can increase the size of the virtual fence to meet particular, e.g., predetermined, dimensions. The first time range can be a time range within 24-hour period and the second time range can also be a time range within that 24-hour period. Here, the first time range can be earlier in the 24-hour period than the second time range.

Continuing this example, the first time range can, in addition to occurring within the 24-hour period, also correspond to first level of foot traffic that is expected in the property 120 or in a particular portion of the property 120 during the first time range. Similarly, the second time range can, in addition to occurring within the 24-hour period, also correspond to second level of foot traffic that is different from the first level. The second level of foot traffic may be an amount of foot traffic expected (e.g., based on trends among historic data) in the property 120 or in a particular portion of the property 120 (e.g., the lobby area 124) during the second time range. As an example, the first level of foot traffic corresponding to the first time range can be greater than the second level of foot traffic corresponding to the second time range, indicating that more foot traffic is expected during the first time range earlier in the day.

In some implementations, the dimensions of a virtual fence used for controlling one or more access points is not predetermined. For example, the management system 102 may determine dimensions using an algorithm (e.g., static algorithm, machine learning algorithm, or hybrid algorithm) and one or more input factors to determine the dimensions for the virtual fence.

In some implementations, security is prioritized over convenience, or convenience is prioritized over security based on one or more factors. The management system 102 may select settings for the virtual fence based on whether security or convenience is presently prioritized. For example, as discussed above, the size and/or location of the virtual fence 202a can correspond to a virtual fence state when convenience is prioritized over security. Similarly, the size and/or location of the virtual fence 202b can correspond to a virtual fence state when security is prioritized over convenience.

In some implementations, the management system 102 uses one or more factors to calculate a security score and a convenience score. For example, the management system 102 may use the time of day, the day of the week, and the expected level of foot traffic to calculate a convenience score. Similarly, the management system 102 may use the time of day and the day of the week to calculate a security score. The management system 102 can use both the security score and the convenience score to adjust the size and location of the virtual fence 202. For example, the virtual fence 202a can correspond to when the management system 102 calculates a convenience score of 0.5 and security score of 0.5. Similarly, the virtual fence 202b can correspond to when the management system 102 calculates a convenience score of 0.1 and a security score of 0.9. The management system 102 may use one or more static or machine learning algorithms to determine the convenience score and/or security score.

In some implementations, the management system 102 uses at least one algorithm to determine the size and/or location of virtual fences for managing an access control point. For example, the management system 102 may provide as input information indicating a time and date, whether the entrance 126 is open, and the detected number of individuals in the lobby area 124 as input to a machine learning model. The machine learning model may be trained using past authorized/unauthorized access rates, and/or occupant feedback. For example, the machine learning model may be a regression model trained to reduce unauthorized access rates (e.g., indicative of a level of security) and negative occupant feedback (e.g., indicative of a level of convenience). The machine learning model may generate an output that the management system 102 can interpret to a particular size and/or location for the virtual fence. The management system 102 can proceed to adjust the size and/or location of the virtual fence in accordance with the output of the machine learning model.

In some implementations, the size and/or location of the virtual fence corresponds to a distance at which tags can be detected by the tag reader 130. For example, the minimum virtual fence size, the virtual fence location, and/or the virtual fence shape may correspond to the location of the tag reader 130 and the maximum distance that the tag reader 130 can detect tags.

The process 300 optionally includes detecting a change in the property and, based on the change, adjusting a size, shape, and/or location of the virtual fence. For example, in response to detecting that the entrance 126 of the property 120 has been opened, the management system 102 can increase the size of the virtual fence 202a. Similarly, in response to detecting that the entrance 126 of the property 120 has closed, the management system 102 can decrease the size of the virtual fence 202b.

As another example, detecting a change in the property can include determining that a number of persons in a third area of the property meets a threshold number of persons. For example, the third area may be defined by the lobby area 124. The management system 102 may use the images 112 to determine the number of individuals within the lobby area 124 and, based on this determination, adjust the size, shape, and/or location of the virtual fence 202. As shown in FIG. 2, the virtual fence 202 can be located within the lobby area 124.

Continuing the example, the management system 102 may use other information to determine the number of people located in the third area. For example, the management system 102 can receive data indicating a number of persons that have entered the lobby area 124 from at least one of an entrance 126 of the property 120 or an access control system of the property 120 (e.g., data indicating the number of persons that have passed through the access control point 128 into the residential area 122), and receive data indicating a number of persons that have exited the lobby area 124 from at least one of an entrance 126 or the access control system of the property e.g., data indicating the number of persons that have passed through the access control point 128 into the lobby area 124). The management system 102 can determine the current number of persons in the lobby area 124 by taking the difference between the number of persons that have entered the lobby area 124 and the number of persons that have exited the third area. The management system 102 can compare the current number of persons in the lobby area 124 to the threshold number of persons.

In some implementations, obtaining images of the first area captured includes obtaining images of an area defined by a virtual fence. For example, with respect to FIG. 2, the management system 102 can use the cameras 132a-132d to capture images of a portion of the property 120 defined by the virtual fence 202a. As an example, if the management system 102 adjusts the size, shape, and/or location of the virtual fence 202, the management system 102 may send instructions to a subset of the cameras 132a-132d to adjust camera settings for that cameras in the subset to better capture the portion of the property 120 defined by the adjusted virtual fence. For example, if the management system 102 dynamically increases the size of the virtual fence 202, the management system 102 may send instructions to each of the cameras 132a-132d to widen their aperture. As another example, if the management system 102 dynamically moves or decreases the size of the virtual fence 202, the management system 102 may send instructions to a subset of the cameras 132a-132d to adjust their position so that they are better aimed at the adjusted virtual fence 202.

After adjusting the size, shape, and/or location of a virtual fence, the management system 102 can capture images of the portion of a property defined by the boundaries of the virtual fence (e.g., periodically or in response to particular events, such as the entrance 126 opening or motion being detected) using one or more cameras or other sensors. For example, after increasing the size of the virtual fence 202 from that depicted by the virtual fence 202b to that depicted by the virtual fence 202a, the management system 102 may use the cameras 132a-132d to capture images of only the portion of the lobby area 124 located closest to the access control point 128. As will be described in more detail below, the management system 102 may proceed to use these images to determine the number of persons located within the boundaries of the virtual fence 202a.

The process 300 includes determining a number of persons in the first area from the images (304). For example, as shown in FIG. 1, the management system 102 can use the images 112 to determine the number of persons located in the lobby area 124. Similarly, with respect to FIG. 2, the management system 102 can use the images 112 to determine the number of persons within the virtual fence 202a and the virtual fence 202b.

In determining a number of persons in the first area from the images, the management system 102 can use one or more imaging techniques to identify individual persons in the first area from the images. For example, the management system 102 can perform facial detection on the images to determine a number of persons in the first area. Similarly, the management system 102 can perform facial recognition on the images to identify unique faces present in the first area and/or to identify previously identified persons present in the first area. For example, where there are two people located in the first area, the management system 102 may perform facial recognition on the images that include representations of the two people and extract two sets of facial feature data as a result of performing the facial recognition. Based on the detection of two faces or of two unique faces having different (e.g., non-matching) facial features, the management system 102 can determine that there are two people currently located in the first area.

Continuing the last example, the management system 102 can proceed to compare the extracted feature data to stored feature data corresponding to previously identified persons, such as persons who have previously entered the first area. The management system 102 may identify a feature match for the first person but fail to identify a feature match for the second person. In response, the management system 102 can determine that the second person has not been previously identified and can create a profile for the second person that includes, for example, their corresponding set of extracted features and/or images that include a representation of the second person.

Similarly, the management system 102 identify previously identified persons from the images. For example, the management system 102 may refer to a database that store profiles for previously identified persons. These profiles can include one or more images for each unique person that has been detected (e.g., within a particular area, as having passed through the access control point 128, as having passed through the entrance 126 of the property 120, etc.). Additionally or alternatively, these profiles can include feature data such as extracted facial feature data for each unique person that has been detected.

The process 300 optionally includes determining a threshold number of unique identifications required based on the determined number of persons in the first area. For example, as shown in FIG. 1, the threshold number of unique identifications can the number of unique identification required by the management system 102 to unlock the access control point 128. The threshold number can be, for example, 75% of the determined number of persons rounded up to the nearest person, 60% of the determined number of persons rounded up to the nearest person, 80% of the determined number of persons rounded up to the nearest person, equal to the determined number of persons, one less than the determine number of persons when there are at least two persons, two less than the determined number of persons when there are at least four persons, equal to one when the determined number of persons is two or less, etc. The threshold number can also or alternatively depend on the time of day, the detected foot traffic in the property, on whether the access control point includes a door or an elevator, etc.

The process 300 includes receiving data indicating one or more unique identifications (306). For example, as shown in FIG. 1, the data can be the unique identifications 110. The unique identifications can each correspond to a particular persons. A unique identification can be assigned to a person, such as to a resident of a property or to a guest of the property. The unique identification can be read by the tag reader 130 shown in FIG. 1 reading a tag of a person using NFC, RFID, Bluetooth, or other type of wireless communication.

As an example, the management system 102 may receive NFC unique identifications (UID) from NFC tags belonging to persons located in the lobby area 124 of the property 120. The management system 102 may have previously assigned the detected NFC tags to occupants of the property 120. The tag reader 130 may detect the NFC tags present within a threshold distance from the NFC tag reader 130 and receive, from the NFC tags, UID for the NFC tags. The tag reader 130 can proceed to transmit these UIDs to the management system 102.

In response to receiving the UIDs 110, the management system 102 can take one or more actions. For example, the management system 102 may simply compare the number of UIDs received to the detected number of persons located within the lobby area 124 or the virtual fence 202. Additionally or alternatively, the management system 102 may use the UIDs 110 to access profiles corresponding to different persons.

In some implementations, a UID can be used to look up a profile of a corresponding person. After accessing a profile, the management system 102 can retrieve information from the profile that the management system 102 can use to verify an identity of the person and/or can use to determine whether to grant access through the access control point 128. For example, the management system 102 can use facial recognition techniques with the images 112 to verify that a person located in in the virtual fence 202 that provided the UID has facial features that match facial features stored with a profile corresponding to the particular UID. This may be used to prevent unauthorized persons from gaining access through the access control point 128 who have stolen or otherwise impermissibly acquired a tag of a different person who is permitted to travel through the access control point 128.

As another an example, the management system 102 may compare the number of UIDs in the UIDs 110 to the number of persons located in the virtual fence 202a to determine whether it should generate instructions to provide access to persons through the access control point 128. However, the management system 102 may also use the UIDs 110 to lookup corresponding profiles to determine if any persons in the lobby area 124 are not permitted to gain access. For example, a profile for a person may indicate that they have been prohibited from entering the property 120. Upon receiving a UID that corresponds to this prohibited person, the management system 102 may (i) generate instructions for the access control point 128 to deny access or (ii) delay transmitting instructions to provide access through the access control point 128 until the tag reader 130 stops detecting the particular UID. The management system 102 may also generate and transmit a notification, e.g., to a security system, indicating that a prohibited persons is located in the property 120.

In some implementations, the management system 102 does not look up profiles in response to receiving UIDs.

The process 300 includes determining a number of persons who are authorized to access a second area (308). For example, with respect to FIG. 1, determining a number of persons who are authorized to access a second area can include the management system 102 determining a number of persons who are authorized to access a second area based on the data indicating one or more unique identifications. For example, upon receiving the UIDs 110, the management system 102 may first determine the number of unique IDs among the UIDs 110. This number may represent the number of persons who are authorized to access the second area. For example, if the management system 102 determines that there two UIDs in the UIDs 110, the management system 102 may determine that two persons are permitted to access the residential area 122 through the access control point 128.

As another example, the management system 102 may use the determined number of unique IDs to calculate a number of persons who are authorized to access the second area. That is, the number of unique IDs may serve as a variable in an algorithm used and/or selected by the management system 102 to calculate the number of persons who are authorized to access the second area. The algorithm can include other variables that correspond to other factors, such as the date, the time of day, the number of users located in the first area, the expected amount of foot traffic, etc. Alternatively, the management system 102 can select an algorithm abased on the data, the time of day, the number users located in the first area, the expected amount of foot traffic, etc.

The management system 102 can use these one or more algorithms to improve the occupant convenience and security. For example, an algorithm used to calculate the number of persons who are permitted to pass through the access control point 128 can include two variables, one variable for the number of UIDs in the UIDs 110 and a second variable for the time of day. When the time is 2:00 pm and the number of UIDs is two, the algorithm may output a value of "4" indicating that four persons are permitted to access the residential area 122. The output value being larger than the number of UIDs may be to account for a time of day when (i) visitors are common and/or (ii) when there is a sufficiently low likelihood of a security event (e.g., theft, burglary, assault, etc.). When the time is 1:00 am and the number of UIDs is two, the algorithm may output a value of "2" indicating that two persons are permitted to access the residential area 122. The output value being equal to the number of UIDs may be to account for a time of day when (i) visitors are less common and/or (ii) when there is a sufficiently low likelihood of a security event.

The process 300 optionally includes comparing the number of authorized persons with the number of persons in the first area. For example, with respect to FIG. 1, determining a number of persons who are authorized to access a second area can include the management system 102 comparing the number of authorized persons with the total number of persons in the lobby area 124. Similarly, with respect to FIG. 2, determining a number of persons who are authorized to access a second area can include the management system 102 comparing the number of authorized persons with the total number of persons in the virtual fence 202. The management system 102 can determine to provide access through the access control point 128 if the number of authorized persons is equal to the number of persons in the first area, and/or if the number of authorized persons meets a threshold number of persons. The threshold number of persons can be the same as the threshold number of unique identifications required to provide access through the access control point 128. Accordingly, comparing the number of authorized persons with the number of persons in the first area can include the management system 102 comparing the number of unique identifications with a determined threshold number of unique identifications required to provide access through the access control point 128.

The process 300 includes providing access to the second area (310). For example, management system 102 can generate and send instructions to the access control point 128 to unlock the access control point 128. Unlocking the access control point 128 can include the management system 102 unlocking one or more doors of the access control point 128, e.g., for a predetermined amount of time such as one second, two seconds, five seconds, etc. Unlocking the access control point 128 can include the management system 102 permitting an elevator of the access control point 128 to operate, allowing an elevator door of the elevator to close, unlocking one or more floors other than the lobby floor, etc. The access control point 128 can automatically relock after a predetermined amount of time has passed, e.g., after one second, after two seconds, after five seconds, etc.

In some implementations, the access control point 128 is a door and providing access to the second area includes the management system 102 providing instructions to the access control point 128 to unlock and/or open the door. The door may be a revolving door, a sliding door, or a traditional door or set of doors.

In some implementations, the access control point 128 is a turnstile and providing access to the second area includes the management system 102 providing instructions to the access control point 128 to unlock the turnstile (e.g., for a predetermined number of turns). The turnstile may be a waist-height turnstile or a full-height turnstile. The turnstile may be an optical turnstile.

In some implementations, access to the second area is provided in response to determining that number of authorized persons meets a threshold number of persons. For example, with respect to FIG. 1, the management system 102 can determine based on there being four persons 140*a*-140*d* in the lobby area 124 that a threshold number of persons (e.g., a threshold number of required unique identifications) is three. Accordingly, if the management system 102 receives three unique identifications from the tag reader 130 (e.g., with a threshold amount of time), the management system 102 can send instructions to the access control point 128 to unlock the access control point 128.

In some implementations, providing access to the second area includes generating instructions for an access control system that is configured to (i) permit access to the second area from the first area in a first mode and (ii) prevent access to the second area from the first area in a second mode, and transmitting the instructions to the access control system. The instructions can include instructions to place the access control system in the first mode to permit access to the second area from the first area. For example, the first mode can be an unlock mode or state, and the second mode can be a locked mode or state.

In some implementations, providing access to the second area includes providing access to a set number of persons. For example, the access control point 128 can include one or more sensors for detecting the number of persons traveling through the access control point 128. After a set number of persons have traveled through the access control point 128, the access control point 128 can automatically change a mode or state. For example, the access control point 128 may receive instructions from the management system 102 specifying that three persons are permitted to enter the residential area 122. After detecting, e.g., using a motion sensor, three persons entering the elevator, the access control point 128 may take one or more actions. For example, the access control point 128 may close the elevator doors. If more than three persons are detected entering the elevator, the access control point 128 may prevent the doors of the elevator from being closed and/or prevent the elevator from moving to a different floor until at least one person gets off the elevator.

The process 300 optionally includes determining that a number of the one or more unique identifications meets a threshold number of unique identifications. Here, providing access to the second area can include providing access to the second area based on the determination that the number of the one or more unique identifications meets the threshold number of unique identifications. The threshold number of unique identifications can dynamically depend on the number of persons detected in the first area. For example, if there are four people in the virtual fence 202, the management system 102 may determine that a threshold of three UIDs is required to provide access through the access control point 128. If two persons move out of the virtual fence 202, the management system 102 can update the threshold to two UIDs required to provide access through the access control point 128.

In some implementations, determining that the number of the one or more unique identifications meets the threshold number of unique identifications includes calculating the threshold number of unique identifications from the number of persons located in the first area, and determining that the number of the one or more unique identifications is greater than or equal to the threshold number of unique identifications. For example, if the management system 102 receives two UIDs from tags located within the virtual fence 202, the management system 102 may determine that the threshold number of UIDs required is met and generate instructions to provide access through the access control point 128.

In some implementations, calculating a threshold number of unique identifications includes applying a predetermined percentage to the number of persons located in the first area. For example, the management system 102 may apply a percentage of 70% to determine the minimum number of UIDs required from a group located within the virtual fence 202 to allow access to the residential area 122. The management system 102 may round up and/or round down (e.g., may depend on the number of persons detected in the first area). For example, if there are five persons located within the virtual fence 202, the management system 102 may apply the 70% and round down to determine that three UIDs are required to provide access. If the number drops to two persons located within the virtual fence 202, the management system 102 may reapply the 70% but round up to determine that two UIDs are required to provide access.

In some implementations, applying the predetermined percentage includes selecting the predetermined percentage from multiple percentages based on at least one of (i) the time of day, (ii) the number of persons in the first area, (iii) the number of persons traveling through the first area, and (iv) a type of entry to the second area from the first area. For example, the number of persons traveling through the first area may be the number of persons that the management system 102 has detected as traveling through the first area, or, alternatively, the number of persons that the management system 102 expects to travel through the first area based on trends in historic foot traffic records. As another example, a type of entry to the second area from the first area can include, for example, an occupant entry (e.g., entry by an occupant that has a tag), a visitor entry (e.g., entry by a person without a tag after an occupant has indicated that a visitor is in the first area), or an emergency entry (e.g., entry by emergency personal after a manager or occupant has indicated that an emergency is occurring, entry by an occupant that indicates that they are experiencing an emergency, etc.).

In some implementations, calculating the threshold number of unique identifications includes providing the number of persons located in the first area as input to an algorithm, and receiving an output of the algorithm. For example, as discussed above, the management system 102 may use one or more static or machine learning algorithms to dynamically determine the threshold number of UIDs required to provide access through the access control point 128. The output of the one or more algorithms can be based on input that includes the number of persons currently located in the lobby area 124 or in the virtual fence 202. The output of the one or more algorithms can be based on other input as well, such as the time of day, day of week, time of year, events taking place, etc. The output of the one or more algorithms can be the threshold number of UIDs or can be interpreted by the management system 102 to determine the threshold number of UIDs. For example, the management system 102 can provide as input to an algorithm a first input indicating that three persons are detected within the virtual fence 202, a second input indicating the date, and a third input indicating the time. Based on there being three persons in the virtual fence, the date indicating that the current day is a Saturday, and the time being 2:00 am, the output of the algorithm can indicate that three UIDs are required to gain access through the access control point 128.

In some implementations, calculating the threshold number of unique identifications includes providing at least one of (i) the time of day, (ii) the number of persons in the first area, (iii) the number of persons traveling through the first area, and (iv) a type of entry to the second area from the first area as input to the algorithm. The output of the algorithm can be based on the number of persons located in the first area and at least one of (i) the time of day, (ii) the number of persons in the first area, (iii) the number of persons traveling through the first area, and (iv) a type of entry to the second area from the first area as input to the algorithm.

Figure 4:
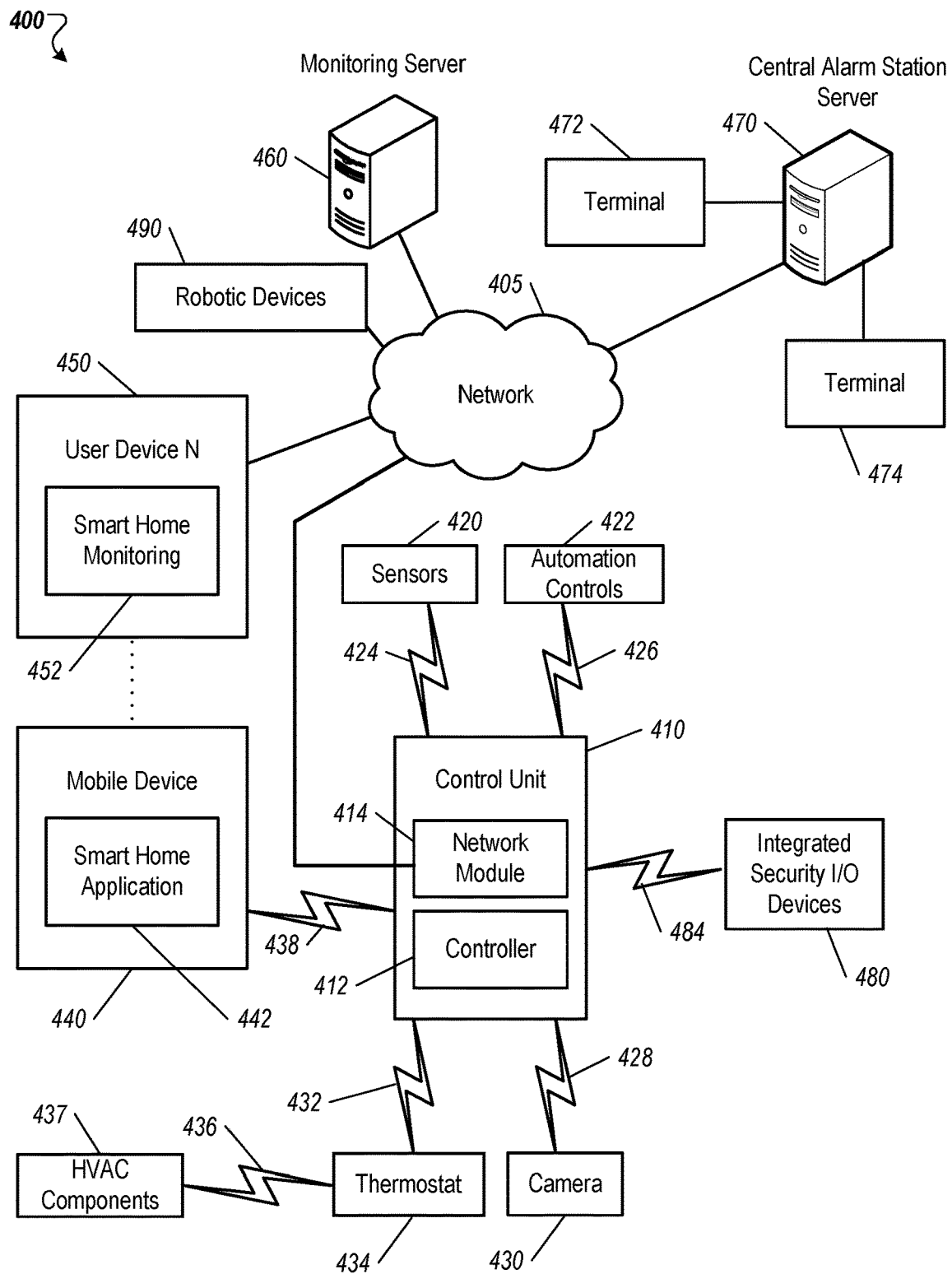
FIG. 4 is a block diagram illustrating an example security monitoring system.

FIG. 4 is a block diagram illustrating an example of a home monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller 412's power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400. For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 452. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
   determining a quantity of one or more unique identifications, wherein each unique identification of the one or more unique identifications corresponds to a person of a number of persons located at a property;
   calculating a threshold quantity of unique identifications from the number of persons located at the property, wherein calculating the threshold quantity of unique identifications comprises applying a predetermined percentage to the number of persons located at the property;
   determining that the quantity of the one or more unique identifications satisfies the threshold quantity of unique identifications for providing access to an area of the property; and
   in response to determining the quantity of the one or more unique identifications satisfies the threshold quantity of unique identifications for providing access to the area of the property, providing access to the area of the property.

2. The computer-implemented method of claim 1, comprising:
   obtaining images of an area defined by a virtual fence; and
   determining the number of persons located at the property comprises determining a number of persons located inside boundaries of the virtual fence.

3. The computer-implemented method of claim 2, comprising:
   detecting a change in the property; and
   based on the change in the property, adjusting a size of the virtual fence,
   wherein obtaining images of the area defined by the virtual fence comprises obtaining images of the area defined by the virtual fence after the adjustment to the size of the virtual fence, and
   wherein determining the number of persons located inside the boundaries of the virtual fence comprises determining the number of persons located inside the boundaries of the virtual fence after the adjustment to the size of the virtual fence.

4. The computer-implemented method of claim 3, wherein:
   detecting the change in the property comprises receiving data indicating that an entrance of the property is open; and
   adjusting the size of the virtual fence comprises reducing the size of the virtual fence based on the entrance of the property being open.

5. The computer-implemented method of claim 3, wherein:
   detecting the change in the property comprises determining that a current time meets (i) a first time range or (ii) a second time range; and
   adjusting the size of the virtual fence comprises (i) reducing the size of the virtual fence based on the current time meeting the first time range or (ii) increasing the size of the virtual fence based on the current time meeting the second time range.

6. The computer-implemented method of claim 5, wherein:
   the first time range is a time range within a twenty-four hour period;
   the second time range is a time range within the twenty-four hour period; and
   the first time range is earlier in the twenty-four hour period than the second time range.

7. The computer-implemented method of claim 5, wherein:
   the first time range is a time range (i) within a twenty-four hour period and (ii) that corresponds to a first amount of expected foot traffic in the property;
   the second time range is a time range (i) within the twenty-four hour period and (ii) that corresponds to a second amount of expected foot traffic in the property; and
   the first amount of expected foot traffic is greater than the second amount of expected foot traffic.

8. The computer-implemented method of claim 3, wherein detecting the change in the property comprises determining that a number of persons in a second area of the property meets a threshold number of persons; and
   adjusting the size of the virtual fence comprises (i) reducing the size of the virtual fence or (ii) increasing the size of the virtual fence.

9. The computer-implemented method of claim 8, wherein the number of persons in the second area include one or more of the number of persons located at the property.

10. The computer-implemented method of claim 8, wherein determining that the number of persons in the second area meets the threshold number of persons comprises determining a number of persons located in the second area from the images.

11. The computer-implemented method of claim 8, wherein determining that the number of persons in the second area meets the threshold number of persons comprises:

receiving data indicating a number of persons that have entered the second area from at least one of an entrance of the property or an access control system of the property;

receiving data indicating a number of persons that have exited the second area from at least one of an entrance of the property or an access control system of the property;

determining a current number of persons in the second area using the number of persons that have entered the second area and the number of persons that have exited the second area; and comparing the current number of persons in the second area to the threshold number of persons.

12. The computer-implemented method of claim 1, wherein providing access to the area of the property comprises:

generating instructions for an access control system that is configured to (i) permit access to the area of the property in a first mode and (ii) prevent access to the area of the property in a second mode, wherein the instructions include instructions to place the access control system in the first mode to permit access to the area of the property; and transmitting the instructions to the access control system.

13. The computer-implemented method of claim 1, wherein applying the predetermined percentage to the number of persons located at the property to, in part, calculate the threshold quantity of unique identifications from the number of persons located at the property comprises:

adjusting the threshold quantity of unique identifications using the number of persons located at the property, wherein adjusting includes one or more of (i) rounding up to a nearest whole number of persons or (ii) rounding down to a nearest whole number of persons.

14. The computer-implemented method of claim 1, wherein determining that the quantity of the one or more unique identifications satisfies the threshold quantity of unique identifications for providing access to the area of the property comprises:

determining that the quantity of the one or more unique identifications is greater than or equal to the threshold quantity of unique identifications.

15. The computer-implemented method of claim 1, wherein calculating the threshold quantity of unique identifications comprises determining one or more persons of the number of persons located at the property are authorized to enter the area of the property.

16. The computer-implemented method of claim 1, wherein applying the predetermined percentage comprises selecting the predetermined percentage from multiple percentages based on at least one of (i) a time of day, (ii) the number of persons at the property, (iii) a number of persons traveling through a second area of the property, and (iv) a type of entry to the area of the property.

17. The computer-implemented method of claim 1, wherein calculating the threshold quantity of unique identifications comprises:

providing the number of persons located at the property as input to an algorithm; and receiving an output of the algorithm, wherein the output indicates the threshold quantity of unique identifications.

18. The computer-implemented method of claim 17, wherein calculating the threshold quantity of unique identifications comprises providing at least one of (i) a time of day, (ii) the number of persons at the property, (iii) a number of persons traveling through a second area of the property, and (iv) a type of entry to the area of the property as input to the algorithm, wherein the output of the algorithm is based on the number of persons located at the property and at least one of (i) the time of day, (ii) the number of persons traveling through the second area of the property, and (iii) the type of entry to the area of the property as input to the algorithm.

19. A system comprising:

one or more computers; and one or more computer-readable media storing instructions that, when executed, cause the one or more computers to perform operations comprising:

determining a quantity of one or more unique identifications, wherein each unique identification of the one or more unique identifications corresponds to a person of a number of persons located at a property;

calculating a threshold quantity of unique identifications from the number of persons located at the property, wherein calculating the threshold quantity of unique identifications comprises applying a predetermined percentage to the number of persons located at the property;

determining that the quantity of the one or more unique identifications satisfies the threshold quantity of unique identifications for providing access to an area of the property; and in response to determining the quantity of the one or more unique identifications satisfies the threshold quantity of unique identifications for providing access to the area of the property, providing access to the area of the property.

20. One or more non-transitory computer-readable media storing instructions that, when executed by one or more computers, cause the one or more computers to perform operations comprising:

determining a quantity of one or more unique identifications, wherein each unique identification of the one or more unique identifications corresponds to a person of a number of persons located at a property;

calculating a threshold quantity of unique identifications from the number of persons located at the property, wherein calculating the threshold quantity of unique identifications comprises applying a predetermined percentage to the number of persons located at the property;

determining that the quantity of the one or more unique identifications satisfies the threshold quantity of unique identifications for providing access to an area of the property; and in response to determining the quantity of the one or more unique identifications satisfies the threshold quantity of unique identifications for providing access to the area of the property, providing access to the area of the property.

* * * * *